3,172,767
MANUFACTURE OF CHEESE CURD
Herbert G. Foster, Jr., Hazel Crest, and Edmund H. Cornwell, Oak Lawn, Ill., assignors to Swift & Company, Chicago, Ill., a corporation of Illinois
No Drawing. Filed June 12, 1961, Ser. No. 116,270
18 Claims. (Cl. 99—116)

The present invention relates in general to a process for the manufacture of cheese and more particularly to an improved process for continuously producing curd well adapted to cheese manufacture.

Conventionally, cheese curd is prepared generally according to the following procedure: A starter (single or mixed cultures of acid-forming bacteria) is added to a vat of milk, and the mixture is held at a suitable temperature for a period of time to promote ripening. The length of time following this procedure depends upon the concentration and activity of the culture, the holding temperature, the pH and fat content of the milk, etc. After the ripening period, rennet is added to form a coagulum made up of curd and whey. The coagulum is then cut into cubes. After the cubing operation, the temperature of the mass is raised to aid in separating the curd from the whey, and approximately 2½ hours after the addition of rennet, during which period acid is produced by action of the bacteria contained in the culture, the whey is drawn off from the vat and the cubed mass remaining in the vat is allowed to mat. The matted mass is then cut into strips. This is intended to be a description of the general process for forming curd. The above steps and conditions are varied to give different types of cheese curd, but in all respects the time involved is lengthy, and the process involves considerable skill to produce a good-tasting cheese with the necessary acidity and good texture.

Chemically, the above described conventional process is believed to involve the conversion of the milk protein from casein to paracasein by the addition of the enzymes of rennet. The paracasein is then precipitated by soluble calcium (and magnesium) salts present in the milk. The resultant insoluble calcium (and magnesium) salt of the altered milk protein is termed curd. The acid which is formed in situ gives the desired acidity and aids in solubilizing the calcium and magnesium so that it will readily precipitate the paracasein. While the cheese industry has felt that rennet required only between about 10–20 minutes to react with the milk protein, the remainder of the time involved in conventional cheese curd manufacture was required to allow for the production of the necessary acidity through bacterial action.

Direct addition of acid to the milk has been contemplated. However, cheese manufacturers found it to be impossible and/or impractical to add an acid directly to the coagulum because the agitation necessary to disperse the acid in the mixture shattered the curd and made it unusable in the manufacture of cheese. The acid, per se, could not be added with or before the rennet or other proteolytic enzyme capable of converting the milk protein to form curd because it instantly curdled the milk, preventing the formation of a good curd.

Attempts have been made to eliminate the necessity of the starter culture method of developing proper acid content necessary for milk coagulation. For example, non-bacterial materials which slowly hydrolyze to form an edible acid have been added to milk. Substantial time is required to develop acidity and to form curd.

In copending application Serial No. 103,955, filed April 14, 1961, of Herbert G. Foster, Jr., et al., there is disclosed and claimed a valuable improvement wherein it is now possible to add a food acid directly to a milk-proteolytic enzyme mixture and obtain a curd having good strength and particle size and eminently suitable in the manufacture of a good flavor and texture cheese. The time involved is negligible.

We have discovered that under certain conditions it is possible to add an edible acid per se to the milk, prior to adding enzyme, without adversely affecting the quality of the resulting curd. In our system, it is possible to prepare cheese continuously and extremely rapidly as well as by conventional vat methods. Use of a starter may be dispensed with if desired.

In the practice of our invention, we have found that the milk used in the process may be either heat treated or not, and may be pasteurized or not in the process of preparing the curd. If the resultant curd is to be considered as pasteurized cheese curd the milk should be heated to a range of 140°–190° F. by mechanical means and held for a period sufficient to produce a negative phosphatase test. However, it is not necessary to pasteurize the milk at this point. It is only necessary to warm the milk in the range of about 85 to 150° F. Temperatures from 85 to 180° F. are operable in the practice of our invention, and operation between 90 and 130° F. produces a somewhat better yield of curd. Operating at temperature above about 180° F. precipitates lactalbumin from the milk, and the curd formed is apt to be undesirably watery.

As mentioned, we have found that it is possible to preadjust the acidity of the milk by direct acid addition prior to addition of enzyme. The natural acidity of milk (i.e., the titratable acidity of the milk as received by the cheese manufacturer) will vary generally from about 0.13% to about 0.20%, skim milk generally having a lower natural acidity than whole milk. In practicing our invention, the minimum amount of directly added acid that will aid in development of a good cheese curd upon addition of enzyme, yet will avoid the previously mentioned problems of direct acid addition, is that amount of nontoxic acid which will increase the titratable acidity of the milk by at least about 0.015%. The maximum amount of acid that can be added in accordance with our invention will vary depending upon the type of milk, e.g. skim or whole, solids content of the milk, and pH of the milk. With skim milk we have found that an acid addition of 0.08% over the natural acidity is about the maximum practical amount of acid that can be added without danger of producing undesirable curd upon addition of rennet or other enzymes. When using whole milk, the maximum amount of acid will depend primarily upon the pH after adjustment of acidity and the solids content of the milk. As the solids content increases, more and more acid can be added without adverse results due to the buffering capacity of the solids. For example, when working with a high solids whole milk we have raised the titratable acidity by direct addition of acid to 0.34% (a value normally considered to be unsatisfactory because the milk would be sour and curdled), and yet, unexpectedly, the milk was not curdled and the curd subsequently prepared from this milk was of good texture and well adapted to manufacture of cheese. When making cheese curd by our hereindisclosed method, the pH should not be lowered below the isolelectric point of the casein of the milk. This point is approximately at pH 4.6–4.7.

From the foregoing it is seen that when practicing our invention the maximum amount of nontoxic acid that can be directly added to whole milk and obtain satisfactory curd is that amount which will lower pH only to about 4.6 or higher yet will not increase titratable acidity sufficiently to denature or curdle the milk protein even though the milk may have a slightly sour taste. This amount of titratable acidity can be well above that normally considered too high for curd preparation and could well represent an increase over natural acidity of .10–.20%. In the practice of our invention we prefer to add sufficient acid to whole milk to adjust its acidity to about 0.26–0.27% and to adjust the acidity of skim milk to about 0.18–0.19%. It should be understood that we would not use a milk in our process whose natural acidity (i.e. the acidity of the milk as received) exceeded that necessary to curdle milk.

The acidity-adjusted milk may be used in conventional batch or vat cheese processing providing good mechanical mixing of subsequently added enzyme to the milk is achieved. However, we prefer to integrate the acid addition operation of our process into the continuous cheese curd manufacturing process disclosed and claimed in the aforementioned application Serial No. 103,955. To this end we first acidify an amount of milk by direct addition of the desired amount of acid. The acid will normally be added as a dilute solution, e.g. a one to ten dilution of acid in water, and will be thoroughly mixed with the milk. The preferred acid is lactic acid. However, any food acid may be used with similar results. Examples of other suitable acids include, but are not limited to, citric acid, acetic acid, hydrochloric acid and phosphoric acid. The acidity-adjusted milk is then heated to within the range of about 85 to 180° F. and metered continuously into a curd-forming zone, such as a conduit, at a predetermined rate. An enzyme capable of converting the milk protein from casein to paracasein is added to the stream of milk flowing in the curd-forming zone. Preferably the enzyme is continuously metered into the milk at a predetermined rate to supply sufficient of the enzyme to form the curd. A more detailed description of the enzyme addition will be given hereafter. A coagulum will form substantially immediately after introduction of the enzyme to the acidity-adjusted milk thus giving a mixture of curd and whey.

Any of the usual starter cultures may be added to the system if desired, at any point along the line of operation. It should be understood that it is possible to carry out this process and obtain good cheese curd without the addition of a culture. However, a culture as well as any additional enzymes that may be desired can be added for any additional benefits they may give in producing good flavor and texture in the cheese made from the resultant curd. If the curd is to be set aside for further curing, it should preferably contain a culture. If a culture is desired, any commercial cheese starter culture can be used. A particularly suitable culture may include organisms of the *Streptococcus lactis* and related types. Other cultures that may be used contain the following organisms: *Streptococcus thermophilus, Streptococcus durans, Lactobacillus bulgaricus, Propionibacterium shermanii,* and *Streptococcus faecalis.*

If desired, calcium chloride may be added to the system, again preferably but not necessarily before enzyme addition to furnish additional soluble calcium ions and thus strengthen the curd formed. If added, the amount should preferably not exceed approximately 0.02% of the salt by weight of the milk.

The curd and whey mixture that forms substantially immediately upon addition of milk protein altering enzyme may then be separated. Preferably the mixture is heated to facilitate separation and may be separated by draining, centrifuging, pressing, etc. The foregoing process may be varied to give differing types of cheese curd, among the variable being alteration of pH range, the culture employed, if any, the source of milk, temperatures, etc.

The enzymes that we have found to be suitable for use in our system are the proteolytic enzymes generally, including proteolytic enzymes of animal, plant, fungal and bacterial origin or mixtures thereof. Of course, the enzyme used should either be non-toxic per se or purified to remove any inedible components. A commercial enzyme preparation is normally used. For example, enzymes of animal origin such as trypsin, pepsin, pancreatin, and rennet; enzymes of plant origin such as those commonly known as bromelin, ficin and papain; enzymes of mold origin such as those derived from *Aspergillus oryzae, Aspergillus niger, Aspergillus alliaceus,* and *Aspergillus wontii;* and those derived from the over-all culture of bacterial organisms such as *Bacillus mesenteroides, Bacterium subtilis,* and *Clostridium welchii* may be used. Other proteolytic enzymes can be used in the practice of our invention, although the foregoing list illustrates the broad group. Of the various enzymes that may be employed, those proteolytic enzymes of animal origin are preferred, especially rennet and pepsin and mixtures thereof.

The enzyme treatment should be carried out under conditions which will not effect excess hydrolysis or digestion of the milk protein. For example, certain of the enzymes, such as pancreatin, tend to continue proteolysis so that the curd that is formed is thereafter broken down. These enzymes can be used if they are inactivated or washed out of the system before undesirable curd breakdown occurs. For example, the curd can be heated sufficiently to destroy the enzyme. This is an especially effective means for inactivating enzyme in a curd to be used in process cheese manufacture. In certain instances hydrogen peroxide and catalase could be added to the system to inactivate the proteolytic enzyme. If the vegetable-origin enzymes are used, it is preferred that they be purified to avoid imparting undesirable flavor and odor to the resulting curd.

Usually rennet will be used to form the curd adapted to cheese manufacture. In this instance, and usually after the milk is heated, between about 0.25 and 1.5% by weight of the milk of a rennet solution (based on a dilution of 1 part rennet in 10 parts water) is added to the milk. Greater percentages of rennet can be used to form curd, but there is no greater yield of curd, there is no noticeable decrease in reaction time, and a greater amount of rennet might adversely affect the flavor of the cheese formed from the curd. We have found that approximately 0.75% rennet solution, by weight of the milk, is the optimum amount of rennet in normal operation.

The various proteolytic enzymes vary considerably in their ability to alter casein. Therefore, varying amounts of the different enzymes are used. A convenient way of determining an effective amount of any particular proteolytic enzyme to be used is to compare its milk clotting ability with that of rennet. It is then simple to compute how much of the desired proteolytic enzyme or mixture of such enzymes is required to give the same action as rennet. That amount of the enzyme can then be prepared in solution form for introduction into the system, as for example by diluting with water. In some instances it may be desirable to add a dispersing agent or carrier (e.g. glycerine, etc.) to aid in forming the enzyme solution. The following table shows comparable amounts of several proteolytic enzymes to give the same milk clotting ability as the $\frac{1}{10}$ rennet solution used at the rate of 40 cc. per 5 gallons of milk.

*Table A*

| Proteolytic enzyme: | Grams/400 cc. solution |
|---|---|
| P–11 (fungal origin) | 31 |
| HT–200 (bacterial origin) | 19.5 |
| Fungal protease | 286 |
| P–15 (derived from mold grown on bran) | 320 |
| EB–21 (bacterial origin) | 104 |
| MT–7820 (fungal origin) | 420 |
| EPB–126 (bacterial origin) | 1200 |
| Bacterial fermentation residue | 95 |
| Ficin | 11.6 |
| Bromelin | 31.3 |
| Papain | 18.8 |

The following examples are illustrative of our invention and are presented for that purpose only. They are not to be construed as limiting the scope of the invention.

EXAMPLE I

Skim milk weighing 1,204 pounds and having a received (natural) acidity of 0.15% was placed in a supply tank. A solution of 330 cc. of an 85% lactic acid in 1500 cc. of water was added to the milk with vigorous agitation. The adjusted acidity was measured and found to be 0.19%. The milk was heated from 40° F. to 120° F. and metered into a conduit at a rate of 400 pounds per hour to form a flowing stream of milk. A 10% rennet solution was metered into the flowing stream of heated acidity-adjusted milk at a rate of 2500 cc. per hour. Curd was formed substantially immediately and continuously in the line upon rennet addition and thereafter separated from the whey on a screen conveyor. The acidity of the whey was found to be 0.12%. The curd formed was of good texture and well adapted to cheese manufacture.

EXAMPLE II

Fourteen hundred and sixty-two pounds of skim milk with a received acidity of 0.14% was placed in a supply tank. A solution of 500 cc. of an 80% lactic acid in 4500 cc. of water was added to the milk with vigorous agitation. The adjusted acidity was 0.19%. The milk was heated in the tank from 40° F. to about 120° F. and started through the system, as in Example I, at a rate of 400 pounds per hour. A 10% solution of an enzyme mixture containing approximately 50% rennet and 50% pepsin was metered into the acidity-adjusted milk stream at a rate of 10,500 cc. per hour. Good texture curd was formed continuously in the pipe line and separated from the whey on a screen conveyor. The acidity of the whey was 0.115%.

EXAMPLE III

A forty gallon batch of whole milk was divided into four aliquot lots A–D. The natural acidity of the milk was .19% and the pH 6.9. Lots B–D were adjusted in acidity with a 10% lactic acid solution and to alternate lots cheese coloring was added to identify each lot passing through the line. The milk was heated to 108° F. and pumped through the continuous cheese curd forming system at a rate of 400 lbs. per hour. A 10% rennet solution was added at a rate of 7200 cc. per hour. Samples of the whey from each lot of milk was taken. The following table shows the analysis of this run:

Table 1

| Lot | Acidity | pH | Acid Solution Added, cc. | Adjusted Acidity | Adjusted pH | pH Whey |
|---|---|---|---|---|---|---|
| A | .19 | 6.9 | None | | | 6.7 |
| B | .19 | 6.9 | 50 | .22 | 6.85 | 6.65 |
| C | .19 | 6.9 | 150 | .235 | 6.75 | 6.52 |
| D | .19 | 6.9 | 250 | .265 | 6.55 | 6.38 |

Curd formed substantially immediately upon addition of rennet in the cases of lots B, C, and D. The quality of the curd and clarity of the whey improved as the acidity was increased. There was no curd formation in lot A until the very end of the run and the whey was very milky.

EXAMPLE IV

A run similar to that set forth in Example III was made except that the acidity of the whole milk was different. Table 2 sets forth the results. Good curd was formed in all samples.

Table 2

| Lot | Acidity | pH | Acid Solution Added, cc. | Adjusted Acidity | Adjusted pH | pH Whey | Acidity Whey |
|---|---|---|---|---|---|---|---|
| A | .20 | 6.9 | 50 | .230 | 6.8 | 6.61 | .14 |
| B | .20 | 6.9 | 100 | .245 | 6.75 | 6.55 | .14 |
| C | .20 | 6.9 | 150 | .255 | 6.65 | 6.45 | .16 |
| D | .20 | 6.9 | 200 | .275 | 6.50 | 6.40 | .17 |

EXAMPLE V

Another run similar to that set forth in Example III was made. Acidity was different and the milk was a high solids content milk. The results are as follows, all lots producing good texture curd:

Table 3

| Lot | Acidity | pH | Acid Solution Added, cc. | Adjusted Acidity | Adjusted pH | pH Whey | Acidity Whey |
|---|---|---|---|---|---|---|---|
| A | .19 | 6.8 | 250 | .225 | 6.4 | 5.8 | .18 |
| B | .19 | 6.8 | 500 | .285 | 5.9 | 5.7 | .185 |
| C | .19 | 6.8 | 700 | .34 | 5.7 | 5.6 | .21 |

It was highly unexpected that these large amounts of acid could be added directly to the milk without instantly curdling the milk and precluding obtention of a good curd.

EXAMPLE VI

Forty gallons of whole milk was heated to 90° F. and put through a cream separator. The acidity of the skimmed milk so produced was found to be .145% and a 10% lactic acid solution was added to various lots to increase the acidity over a range of from 0.165% to 0.28%. The milk was then further heated to 120° F., placed in a supply tank and pumped into a pipe at the rate of 400 lbs. per hour while a 10% rennet solution was metered into the milk stream at a rate of 7200 cc. per hour. The following results were found:

Table 4

| Lot | Acidity | pH | Acid Solution Added, ml. | Adjusted Acidity | Adjusted pH | pH Whey | Acidity Whey |
|---|---|---|---|---|---|---|---|
| A | .145 | 6.5 | 100 / 150 | .165 / .18 | 6.4 | 5.85 | .125 |
| B | .145 | 6.5 | 200 / 250 | .19 / .20 | 6.2 | 5.80 | .15 |
| C | .145 | 6.5 | 300 / 350 | .22 / .23 | 6.05 | 5.65 | .165 |
| D | .145 | 6.5 | 450 / 550 | .235 / .28 | 5.65 | 5.4 | .20 |

Curd was formed from all the above samples of skim milk. However, the curd formed from the milk having an adjusted acidity of 0.23% and above was too firm to discharge well from the line. It is quite questionable whether this very firm curd could be used without further treatment (such as treating with a base) to form cheese.

EXAMPLE VII

This run was similar to that of Example VI except that the natural acidity of the milk differed. An acceptable curd was formed at each of the adjusted acidities shown below. The curd was sweet and the whey drained rapidly.

Table 5

| Lot | Acidity | pH | Acid Solution Added, cc. | Adjusted Acidity | Adjusted pH | pH Whey | Acidity Whey |
|---|---|---|---|---|---|---|---|
| A | .15 | 6.6 | 50 | .165 | 6.53 | 6.4 | .10 |
| B | .15 | 6.6 | 100 | .175 | 6.48 | 6.32 | .115 |
| C | .15 | 6.6 | 150 | .20 | 6.35 | 6.2 | .120 |

*Table 5*

For the purposes of this specification and the appended claims, "milk" is intended to include whole milk, skim milk, fat-fortified milk, and partially defatted milk, whose natural acidity does not exceed that necessary to curdle the milk protein.

Obviously many modifications and variations of the invention as hereinbefore set forth may be made without departing from the spirit and scope thereof, and therefore only such limitations should be imposed as are indicated in the appended claims.

We claim:

1. A method for treating milk to obtain a coagulum adapted to cheese manufacture which comprises: adjusting the acidity of the milk by directly adding sufficient of a food acid to raise the percentage titratable acidity at least about 0.015%, and insufficient to lower the pH of said milk below about pH 4.6, heating said milk to a temperature of about 85–180° F. and adding a proteolytic enzyme to said heated acidity-adjusted milk whereby a coagulum is formed substantially immediately.

2. A method for treating milk to obtain a coagulum adapted to cheese manufacture which comprises: adding an amount of food acid directly to said milk sufficient to raise the percentage acidity at least about 0.015% and insufficient to lower the pH thereof below the isoelectric point of casein, heating said acidity-adjusted milk to a temperature of about 85–180° F., and adding a proteolytic enzyme to the acidity-adjusted milk whereby a coagulum is formed substantially immediately.

3. The method of claim 2 wherein the acid is lactic acid and the enzyme is rennet.

4. The method of claim 2 wherein the acid is lactic acid and the enzyme is a mixture of rennet and pepsin.

5. A method for treating skim milk to obtain a coagulum adapted to cheese manufacture which comprises: adjusting the acidity of said skim milk by adding sufficient of a food acid directly to said milk to raise the percentage acidity between about 0.015% and about 0.08%, heating said milk to a temperature of about 85–180° F., and thereafter adding a proteolytic enzyme to said acidity-adjusted skim milk to immediately form a coagulum.

6. The method of claim 5 wherein the acid is lactic acid and the enzyme is rennet.

7. The method of claim 5 wherein the acid is lactic acid and the enzyme is a mixture of rennet and pepsin.

8. A continuous method for treating milk to obtain a coagulum adapted to cheese manufacture which comprises: heating said milk to a temperature of about 85–180° F., adjusting the acidity of the milk by directly adding sufficient of a food acid to raise the percentage titratable acidity at least about 0.015%, but insufficient to lower the pH thereof below the isoelectric point of casein, forming a flowing stream of said heated acidity-adjusted milk, and substantially continuously metering a proteolytic enzyme into said flowing stream to form a coagulum substantially immediately.

9. A continuous method for treating milk to obtain a coagulum adapted to cheese manufacture which comprises: adding an amount of food acid directly to said milk sufficient to raise the percentage acidity at least about 0.015% and insufficient to lower the pH of said milk below about 4.6, forming a flowing stream of acidity-adjusted milk, heating said milk to a temperature of about 85–180° F. and substantially continuously incorporating a proteolytic enzyme into said stream whereby a coagulum is formed substantially immediately.

10. The method of claim 9 wherein the acid is lactic acid and the enzyme is rennet.

11. The method of claim 9 wherein the acid is lactic acid and the enzyme is a mixture of rennet and pepsin.

12. A continuous method for treating skim milk to obtain a coagulum adapted to cheese manufacture which comprises: heating said milk to a temperature of about 85–180° F., adjusting the acidity of said skim milk by directly adding sufficient of a food acid to raise the percentage acidity between about 0.015% and about 0.08%, forming a flowing stream of said heated acidity-adjusted skim milk, and substantially continuously incorporating a proteolytic enzyme into said stream whereby a coagulum is formed substantially immediately.

13. The method of claim 12 wherein the acid is lactic acid and the enzyme is rennet.

14. The method of claim 12 wherein the acid is lactic acid and the enzyme is a mixture of rennet and pepsin.

15. A method for treating whole milk to obtain a coagulum adapted to cheese manufacture which comprises: heating said milk to a temperature of about 85–180° F., adding sufficient lactic acid directly to said heated whole milk to adjust the acidity to about 0.26–0.27%, and adding rennet to said acidity-adjusted whole milk whereby a coagulum is formed substantially immediately.

16. The method of claim 15 wherein a culture is added and calcium chloride is added to strengthen the curd of the coagulum.

17. A method for treating skim milk to obtain a coagulum adapted to cheese manufacture which comprises: adding sufficient lactic acid directly to said skim milk to adjust the acidity to about 0.18–0.19%, heating said milk to a temperature of about 85–180° F., and adding rennet to said acidity-adjusted skim milk whereby a coagulum is formed substantially immediately.

18. The method of claim 17 wherein a culture is added and calcium chloride is added to strengthen the curd of the coagulum.

References Cited in the file of this patent

UNITED STATES PATENTS

| | | |
|---|---|---|
| 2,446,550 | North et al. | Aug. 10, 1948 |
| 2,851,363 | Kielsmeier | Sept. 9, 1958 |
| 2,982,654 | Hammond et al. | May 2, 1961 |
| 2,997,395 | Berridge | Aug. 22, 1961 |